(12) United States Patent
Kabakov (10) Patent No.: US 6,860,772 B2
(45) Date of Patent: Mar. 1, 2005

(54) TRANSVERSE WATERCRAFT PROPELLER

(76) Inventor: Vladimir M. Kabakov, 4600 S. Four Mile Run Dr., Apt. 1201, Arlington, VA (US) 22204

( * ) Notice: Subject to any disclaimer, the term of this patent is extended or adjusted under 35 U.S.C. 154(b) by 0 days.

(21) Appl. No.: 10/309,897

(22) Filed: Dec. 5, 2002

(65) Prior Publication Data

US 2003/0073360 A1 Apr. 17, 2003

Related U.S. Application Data

(63) Continuation-in-part of application No. 10/093,731, filed on Mar. 11, 2002, now Pat. No. 6,554,666, which is a continuation-in-part of application No. PCT/US01/16526, filed on Jul. 17, 2001.

(51) Int. Cl.[7] .................................................. B63H 1/08
(52) U.S. Cl. ........................................ 440/93; 416/110
(58) Field of Search .............................. 440/90, 92, 93, 440/12.68; 416/110; 244/9, 19, 20, 70

(56) References Cited

U.S. PATENT DOCUMENTS

| | | | | |
|---|---|---|---|---|
| 839,897 A | * | 1/1907 | Smith ........................ | 440/93 |
| 1,752,200 A | * | 3/1930 | Raimondi .................. | 440/93 |
| 1,992,913 A | * | 2/1935 | Hayden .................... | 440/12.68 |
| 2,231,620 A | * | 2/1941 | Goldenberg | |
| 2,449,320 A | * | 9/1948 | Raimondi ................ | 440/12.68 |
| 2,705,538 A | * | 4/1955 | Russo | |
| 6,224,441 B1 | * | 5/2001 | Kabakov .................... | 440/93 |
| 6,227,483 B1 | * | 5/2001 | Therriault .................. | 244/20 |
| 6,352,458 B2 | * | 3/2002 | Kabakov .................... | 440/93 |
| 6,554,666 B2 | * | 4/2003 | Kabakov .................... | 440/93 |

FOREIGN PATENT DOCUMENTS

WO       WO 02/08054 A1    *    1/2002

* cited by examiner

*Primary Examiner*—Sherman Basinger (57) ABSTRACT

A propulsive force for propelling different types of water vehicles is developed by four paddles mounted on the planetary gearbox which is rotated by the transversely oriented driving shaft. Each paddle has, preferably, two perpendicular to each other balanced blades and is rotated simultaneously around the axis of the driving shaft and around the axes of the output shafts of the planetary gearbox. During each turn of the driving shaft, four propulsion strokes are exerted consecutively. Each propulsion stroke is exerted by four blades which are moving along the specific curved paths with acceleration and deceleration caused by changing their circumferential velocity. Both sides of the blades are used consecutively as working surfaces. Optionally, each paddle can have one blade and a counterweight. The driving shaft can be oriented horizontally or vertically and disposed together with the planetary gearbox and the paddles under the water level or over the water level. It is rotated by an internal combustion engine or by any other driver. The propulsion apparatus can also be used in the outboard engines instead of the conventional screw propellers.

18 Claims, 9 Drawing Sheets

TRANSVERSE WATERCRAFT PROPELLER

CROSS-REFERENCE TO RELATED APPLICATION

The present application is a continuation-in-part of application Ser. No. 10/093731 filed on Mar. 11, 2002 which is now U.S. Pat. No. 6,554,666 which is a continuation-in-part of International application PCT/US01/16526 filed on Jul. 17, 2001 (priority date Jul. 20, 2000) now International Publication (PCT) No. WO 02/08054 A1, which was published under PCT Article 21(2) in English.

BACKGROUND OF THE INVENTION

1. Field of the Invention

This invention relates generally to improvements in propeller systems for developing a propulsive force, and more particularly, it pertains to a new method and apparatus for propelling watercraft, such as boats, ships, ferries, rafts, fish-boats, dredges, tankers, tug-boats, etc.

2. Description of the Prior Art

Nowadays, the most common means for propelling watercraft is the screw type propeller wherein the axis of rotation of the blades is disposed along the advancement direction of the vehicle. The screw propellers displace the water as a result of orientation of the blades with angles of incident relative to the advance direction. Only the rearward component of the velocity of advance direction, they have to be rotated in water with very high speed to develop a sufficient propulsion force. As a result, much of the energy is wasted on rotation of water with formation of water disturbances such as visible wakes, vortices, cavitation, etc. That is why efficiency of the screw propellers is low, especially when they are used for propelling many types of heavy boats and ships. They have a very limited optimum range.

To improve such disadvantageous aspects of the screw propellers, various propulsion apparatus have been developed throughout the years with a transversely disposed axes of rotation of the blades (vertical or horizontal) for developing more effective propulsion force with lower speed of rotation. Numerous patents and researches have been devoted to development of propeller systems wherein the propeller blades are pivoted simultaneously with rotation of the driving shaft and to the problem of optimizing the cyclic variations of the orientation of individual blades. Some of such systems utilize rotation of propeller blades or paddles not only around the axis of the driving shaft but also around complementary axes of rotation. The basic concept presented in these systems is that the usable propulsive force is developed as a result of rotating the blades around two axes of rotation with variable orientation of the rotated blades relative to the driving shaft.

Propulsion apparatus are known (U.S. Pat. Nos: 1,284,282 to Fitzpatrick, 1,450,454 to Roney, 1,667,140 to Clark, 1,923,249 to Abram) wherein blades of feathering type extend radially from the of the paddles has a pair of perpendicular to each other blades driving shaft and are rotated around radial axes simultaneously with rotation of the driving shaft. In the paddling position, the blades are held in a plane parallel to the axis of the driving shaft and in the feathering position, the blades are held in a plane perpendicular to the axis of the driving shaft. A serious drawback of such systems is that, in the process of changing from one position to the other, the blades have to be rotated 90 degrees around their longitudinal axes with a considerable resistance of the fluid and low paddling and propulsion efficiency during such rotation.

There are also known propulsion apparatus wherein the propeller blades are oriented and rotated in the planes parallel to the driving shaft (U.S. Pat. No. 3,270,820 to Frazier, British patent No. 217,223 to Pensovecchio). Although having advantages in respect to the propellers with feathering blades, such apparatus with only two blades mounted in a plane perpendicular to the propeller shaft also have low efficiency and irregular power consumption. Different combinations of such propulsion apparatus are cumbersome and the mechanisms employed to effect their operations is complicated. For these reasons, a limited practical success has been obtained by such type of apparatus.

Another disadvantage of the conventional screw propellers is their vulnerability to underwater impact and damage when they are used in shallow water or in situations when there are different kinds of submerged debris such as tree logs, limbs, etc. In most cases the conventional screw propeller cannot be raised sufficiently to enable the craft to be beached.

To solve this problem, the screw propeller can be mounted on the watercraft in such a position that a portion of the propeller blades rotate out of the water, as described, for example, in U.S. Pat. No. 5,807,151 to Sumino. However, such a mounting of the screw propellers considerably reduces their propulsion efficiency. As a result, the usage of such water surface-piercing screw propellers remains restricted.

Different types of paddle-wheels which are used for propelling watercraft in shallow water or in the water containing dangerous debris, as disclosed, for example, in U.S. Pat. No. 6,264,518 to Price and U.S. Pat. No. 6,447,352 to Nuss, also provide very low propulsion efficiency, speed and maneuverability for the watercraft.

The present invention seeks to overcome the deficiencies of known propulsion systems and to benefit from the advantages that may be expected from the new method and apparatus.

The object of the invention is to provide a reliable propelling apparatus with a transversely disposed driving shaft and improved propulsion efficiency for different types of the watercraft.

BRIEF SUMMARY OF THE INVENTION

The invention is based on my discovery that an effective propulsive force in a liquid fluid can be developed as a result of rotation of four paddles (or other similar fluid moving means) simultaneously in two perpendicular planes with the same speed. Preferably, each paddle has two blades which are perpendicular to each other and balanced relative to the axes of rotation. The paddles are mounted on a driving shaft which is disposed transversely to the advancement direction of the watercraft. The paddles are interconnected so that when two of the paddles are parallel to the axis of the driving shaft the other two of the paddles are parallel to an axis which is perpendicular to the axis of the driving shaft. Each of the paddles is rotated together with the driving shaft and, simultaneously, around the axis which is perpendicular to the axis of the driving shaft.

In a preferred embodiment of the propulsion apparatus, a planetary gearbox is mounted on the driving shaft and the paddles are mounted on four output shafts of this planetary gearbox. The driving shaft is rotated by an internal combustion engine or any other type of drive. Preferably, the driving shaft is hollow and the sun bevel mitre gears of the planetary engagement in the gearbox is fixed on a support rod which is disposed axially in this hollow driving shaft.

The planetary gearbox also encloses one or two planet bevel mitre gears which are engaged with the sun bevel mitre gear, and four bevel mitre gears engaged with each other and mounted on the radial output shafts. The paddles are fixed on the ends of the output shafts and are constrained by the planetary gear engagements to rotate together with the output shafts with the rotational speed the driving shaft. Two blades perpendicular to each other on the ends of each of the paddles are balanced relative to the axis of rotation of the output shaft. The adjacent paddles are rotated in opposite directions (clockwise and counterclockwise) in perpendicular planes. During such double rotations the extensions of the blades relative to the axis of the driving shaft are changing as a function of the angle of rotation. As a result, circumferential velocities of the blades are gradually accelerated when they move downward during each propulsion stroke. Both sides of the blades are used consecutively as paddling surfaces.

The driving shaft can be mounted horizontally or vertically on the transom of a watercraft. The horizontal driving shaft with a planetary gearbox can be mounted under the water level or over the water level.

When the driving shaft is disposed over the water level, the likelihood of underwater impact is considerably reduced. Such a propulsion system can be particularly useful for propelling any existing or specially designed watercraft in shallow water or in the other situations when a conventional screw propeller can be easily damaged. There are no efficiency losses normally associated with shallow draft systems of the conventional screw propellers.

BRIEF DESCRIPTION OF THE DRAWINGS

The method of propelling watercraft, the main features of the propulsion apparatus and other objectives of the present invention]will become apparent from the following description taken in conjunction with preferred embodiments thereof with reference to the accompanying drawings, in which.

The identical details in all the drawings have the same designations.

DETAILED DESCRIPTION OF THE INVENTION

Figure 1:
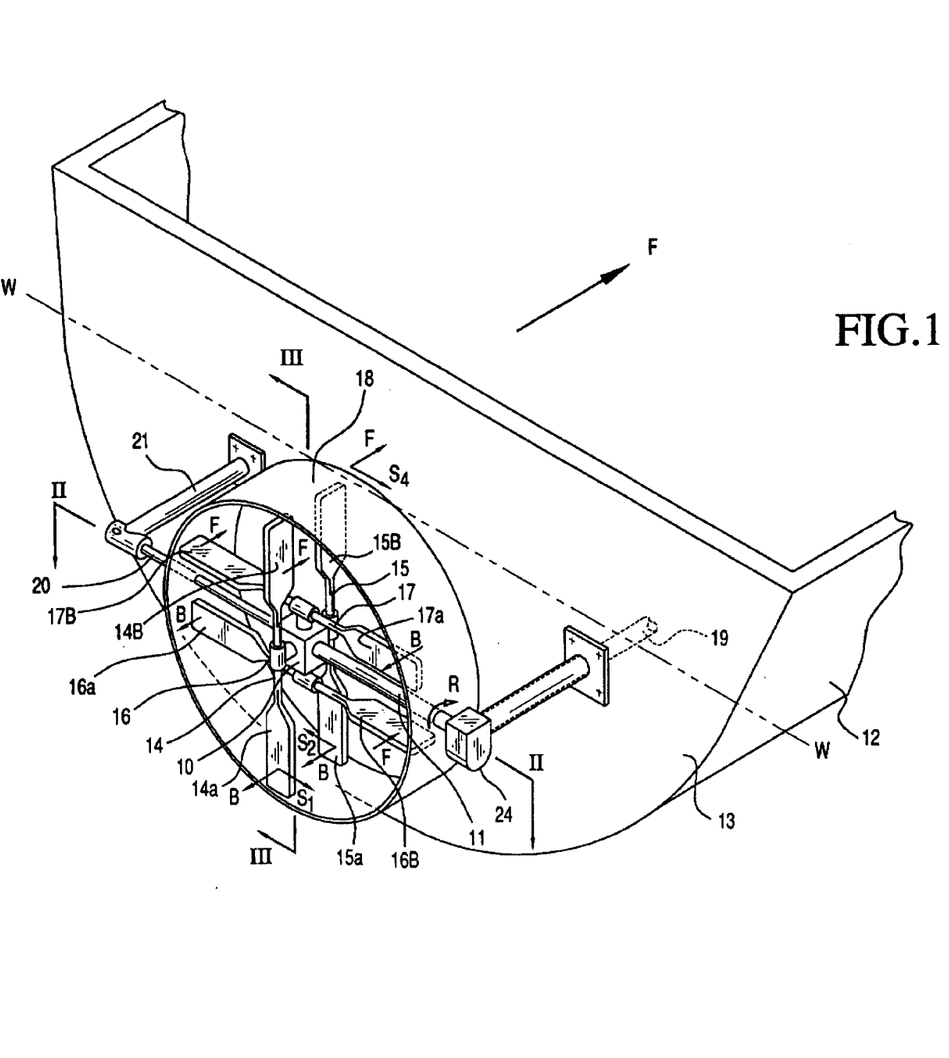
FIG. 1 is a schematic perspective view of the propulsion apparatus mounted on the transom of a watercraft according to the preferred embodiment of the present invention.

Referring now to FIG. 1 the propulsion apparatus according to the preferred embodiment of the present invention comprises a planetary gearbox 10 mounted on a horizontal driving shaft 11 which is disposed transversely to the advancement direction F of watercraft 12. The driving shaft 11 is mounted on the transom 13 of the watercraft 12 so that it is disposed under the water level W. Four paddles (or other similar fluid moving means) 14, 15, 16, and 17 are mounted on the output shafts of a planetary gearbox 10. Each of the paddles has a pair of perpendicular to each other blades designated as 14a–14b, 15a–15b, 16a–16b and 17a–17b, respectfully, which can be of any desired shape and size and are balanced relative to the axes of the output shafts of the planetary gearbox 10. A generally cylindrical protective cover 18 is mounted around the planetary gearbox 10 and the paddles.

During the operation, the driving shaft 11 is rotated together with the planetary gearbox 10 and the paddles 14, 15, 16, 17 in the direction of an arrow R by an internal combustion engine or any other driver (not shown). The engine output shaft 19 extends through the transom 13 in the usual manner. The paddles 14, 15, 16 and 17 are constrain by the planetary gearbox 10 to rotate around the axes of the output shafts of the planetary gearbox 10 with the rotational speed of the driving shafts 11. The paddles adjacent to each other in the perpendicular planes are rotated in opposite directions (clockwise and counter-clockwise) not interfering with each other.

During each 360 degrees turn of the driving shaft 11, four propulsion strokes are exerted which follow consecutively one after another. Each propulsion stroke is exerted by the movement of four blades 14a, 15a, 16a, 17a or by the blades 14b, 15b, 16b, 17b which follow a specific curved path with acceleration and deceleration caused by changing their circumferential velocities. Such acceleration during the propulsion strokes resembles the movement of the fish-tail and is believed to be an important factor for developing an effective propulsion force.

In order to facilitate the understanding of the development of the propulsion force as a result of the rotations of the paddles in two perpendicular planes, the movement of the blades is explained with references to FIG. 1 which illustrates the position of the blades in the middle of the propulsion stroke. The rotation of the paddles 14 and 15 around the axis of the driving shaft 11 and around two output shafts of the planetary box 10 which are horizontal in the position of FIG. 1 causes each of the two oriented downwards blades 14a and 15a to move simultaneously in two perpendicular directions: backwards along the arrows B and sidewards along the arrows S1 or S2. Because the blades 14a and 15a are oriented perpendicular to the direction of arrows B, they displace the water in an astern direction and in this turn develop a reaction force which thrusts the watercraft 12 forward in the direction of arrow F. The blades are disposed in the planes of the sidewards directions along the arrows S1 and S2, so that they have minimum water resistance. Because the water is a yielding substance which gives way a little under the pressure of the blades, such a sideward movement of the blades improve their efficiency in comparison with the simple paddling.

The blades 14b and 15b, which are oriented upwards in the position of FIG. 1, move forward along the arrows F with minimum water resistance because they are disposed in the plane of such a movement, and sidewards along the arrows 53 or 54. To reduce the water resistance during the sideward movements, the driving shaft 11 can be disposed in such a depth under the water level that the blades 14b and 15b extend out of the water when they are oriented generally upwards.

The rotation of the horizontally oriented paddles 16 and 17 around the output shafts of the planetary gearbox 10 (which are vertical in the position of FIG. 1) causes the blades 16a and 17a to move backwards along the arrows B. Because these blades are disposed perpendicular to this direction, they also push the water backwards and develop a reaction propulsion force which thrusts the watercraft 12 forward.

The other two blades 16b, 17b of the paddles 16 and 17 move forward along the arrows F. They are disposed in the plane of this direction to minimize the water resistance during such a movement. As a result, a combined propulsion stroke is exerted simultaneously by four blades 14a, 15a, 16a and 17a.

During each propulsion stroke, the orientations of the blades are gradually changing so that when four blades are moving backwards exerting a propulsive force, the other four blades are moving forward taking the position for the next propulsion stroke. The backward moving blades are always oriented perpendicular to such movement exerting the propulsion force propelling the watercraft. When the orientations of the blades are changing from the horizontal to the downward position, the circumferential velocity of their rotations around the axis of the driving shaft is increased which produces an additional propulsion effect. The forward moving blades are always oriented in the plane of such movement with minimum resistance in the water. The blades which are plunged into the water are also oriented in the planes of sideward movement with low water resistance.

The efficiency of propulsion, i.e. the proportion of the engine power output that is utilized for propelling the watercraft, is determined by the difference between the approach velocity of the water, which is equal to the speed of the ship, and the velocity of the water displaced astern at each revolution. At each revolution of the transversely disposed driving shaft 11, the backward motion of the blades is much larger than the pitch of an axially disposed screw propeller and, as a result, more water with greater velocity is displaced astern with the same rotational speed. Because the blades in the water are oriented in the planes of their sideward movements, the water resistance and loss of energy as a result of such movement is less than in the rotated axial screw propeller.

Figure 2:
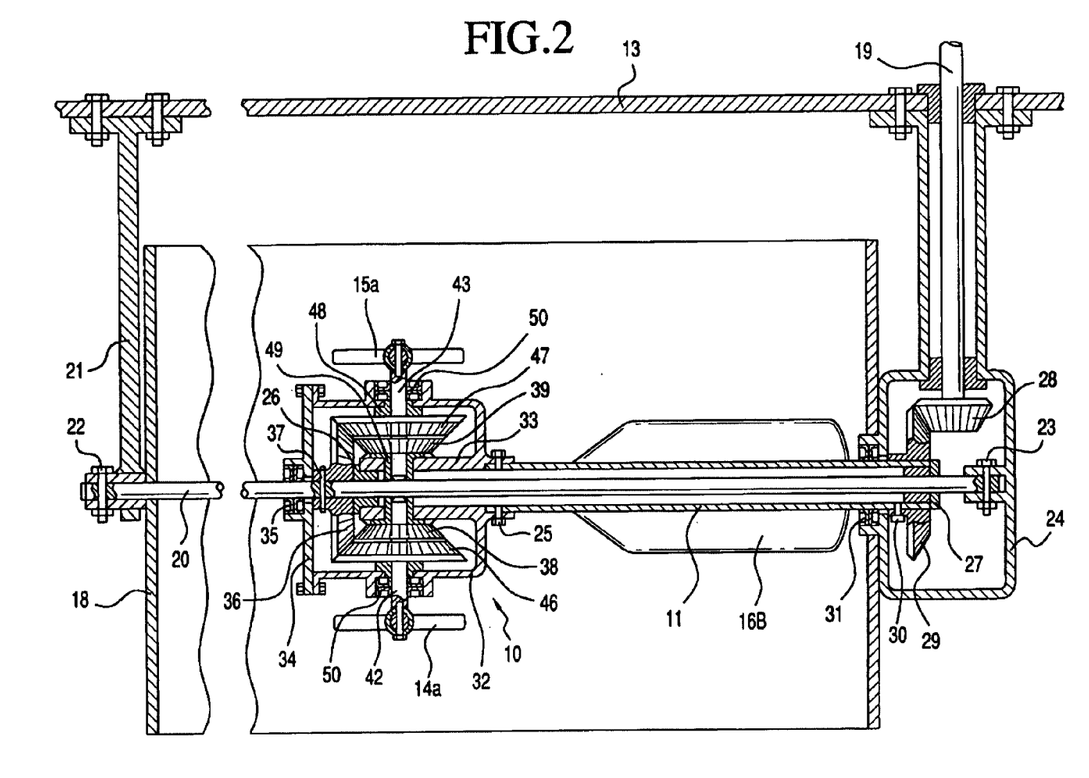
FIG. 2 is a horizontal cross-sectional view along line II—II in FIG. 1.
Figure 3:
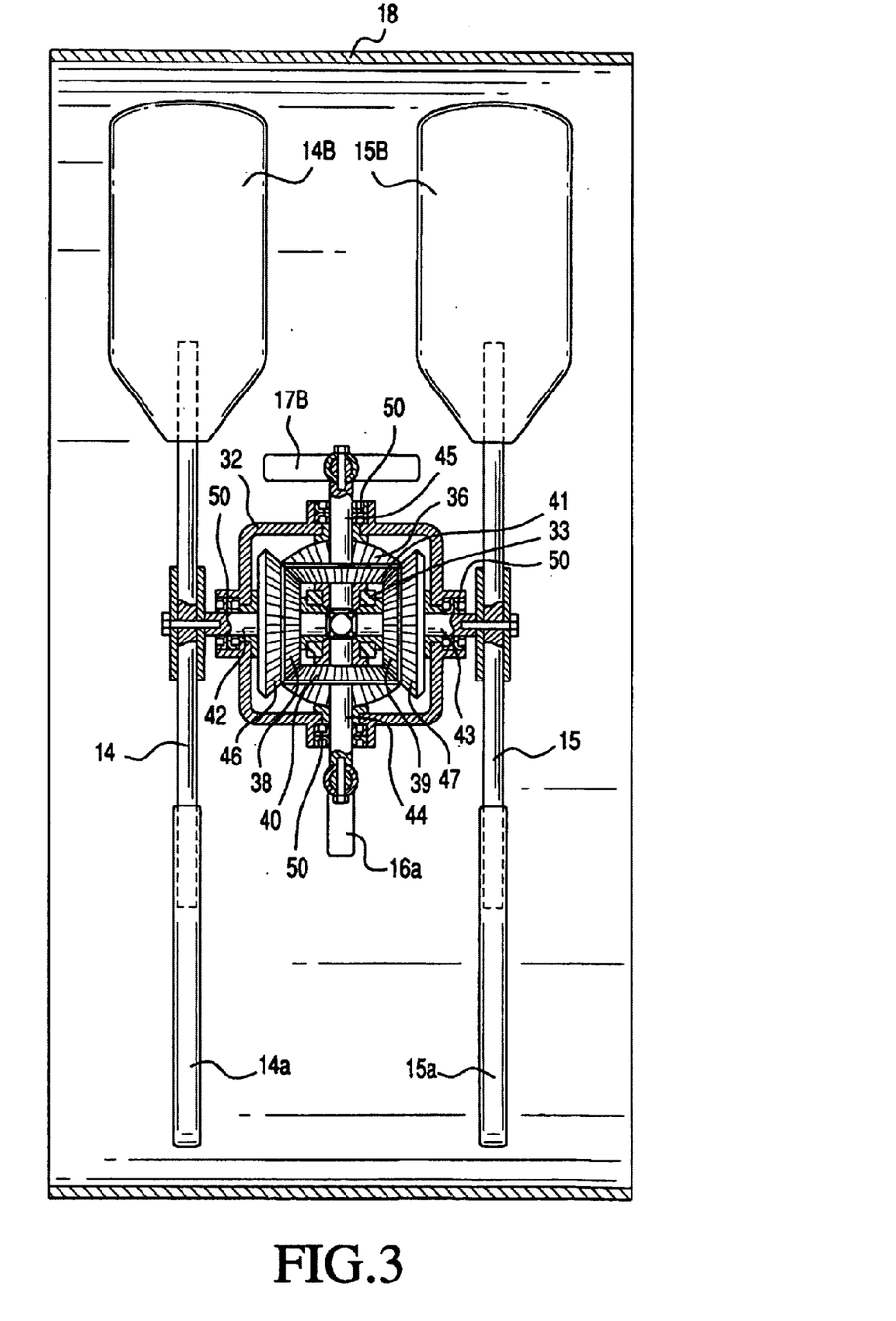
FIG. 3 is a vertical cross-sectional view along line III—III in FIG. 1.

FIGS. 2 and 3 illustrate the design of the planetary gearbox 10 and the mounting system in the embodiment shown in FIG. 1. A support rod 20 is mounted horizontally on the transom 13. One end of the support rod 20 is fixed to a bracket 21 by the bolt 22 and the other end can be fixed by the bolt 23 inside of a gearbox 24 which are mounted on the transom 13. The planetary gearbox 10 is fixed to the hollow driving shaft 11 by the bolts 25. The driving shaft 11 is mounted together with the planetary gearbox 10 on the support rod 20 in the bearings 26 and 27. The gearbox 24 encloses a conventional bevel gear drive consisting of a pinion bevel gear 28 mounted on the shaft 19 and a driven bevel gear 29 fixed by the bolts 30 on the end of the hollow driving shaft 11 which extends in the gearbox 24 through a sealing element 31.

The planetary gearbox 10 includes a housing 32 having a central hub 33 (which can be made integrally with the housing) and the cover 34. The support rod 20 extends through a sealing element 35 in the cover 34. The housing 32 encloses a planetary bevel mitre gear engagement which includes the sun bevel mitre gear 36 fixed on the support rod 20 by a pin 37, four identical bevel mitre gears 38, 39, 40, 41 mounted on the radial output shafts 42, 43, 44, 45, respectively, and two planet bevel mitre gears 46, 47 which are also fixed on the output shafts 42, 43, respectively. The planet gears 46 and 47 are engaged with the sun gear 36 with one-to-one ratio. The gears 38, 39, 40, 41 are engaged with each other with one-to-one ratio. Each of the radial output shafts 42, 43, 44, 45 is mounted in two bearings 48 and 49. One of these bearings 48 is disposed in the wall of the housing 32 and another bearing 49 is disposed in the central hub 33. The output shafts 42, 43, 44, 45 extend through the sealing elements 50 in the housing 32. The paddles (or other similar fluid moving means) 14, 15, 16, 17 are mounted on the ends of the output shafts 42, 43, 44, 45, respectively. Each of the paddles is disposed with extensions in opposite directions from the Output shaft and is balanced so that the center of gravity of the paddle is disposed on the axis of rotation of the output shaft. The planetary gearbox 10 and the gearbox 24 can be filled with a lubricating oil.

In the operation, an engine (not shown) rotates the planetary gearbox 10 together with the hollow driving shaft 11 through the shaft 19 and the gearbox 24. The radial output shafts 42, 43 are rotated by the planet bevel mitre gears 48, 47 which are engaged with the fixed sun bevel mitre gear 36. The radial output shafts 44, 45 are rotated by the engaged bevel mitre gears 38, 39, 40, 41. The protective cover 18 can be fixed to the housing of the gearbox 24, to the bracket 21 and to the support rod 20. It also can be mounted directly on the transom 13.

Figure 4:
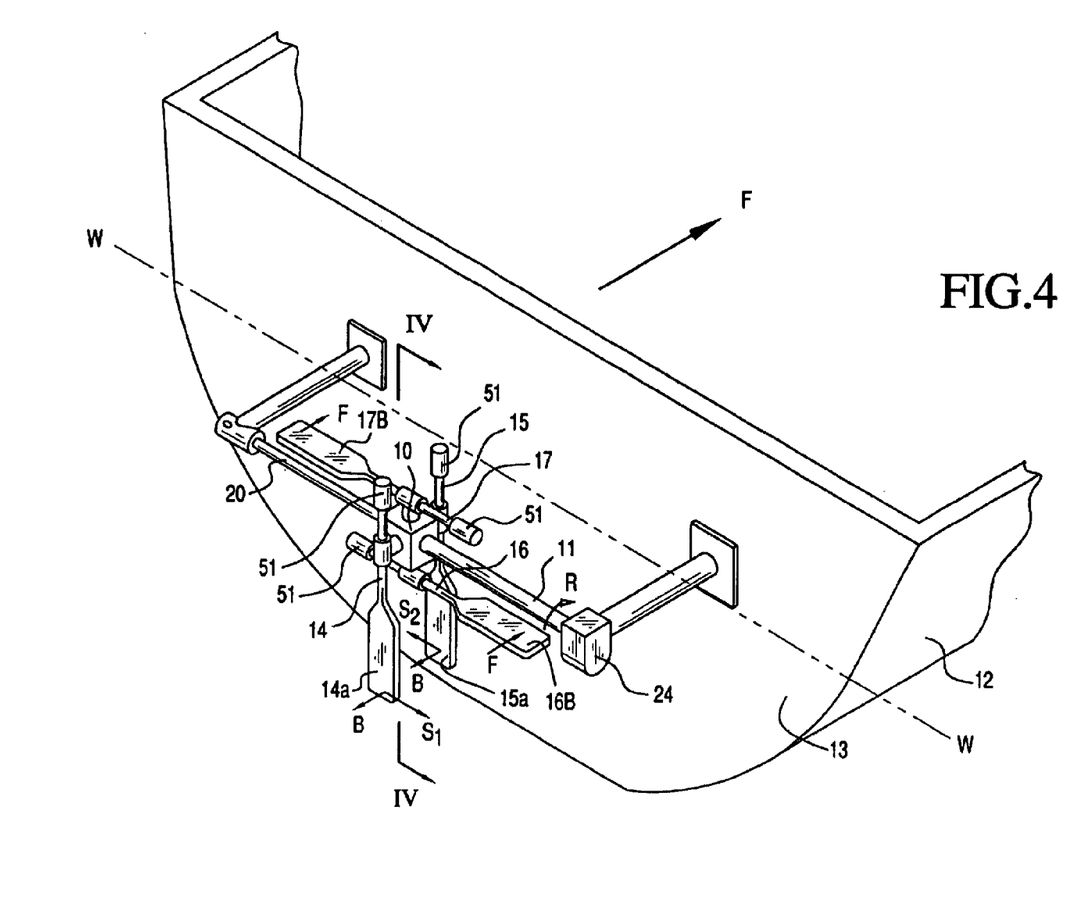
FIG. 4 is a schematic perspective view of an alternative embodiment of an the propulsion apparatus with a horizontal driving shaft.
Figure 4A:
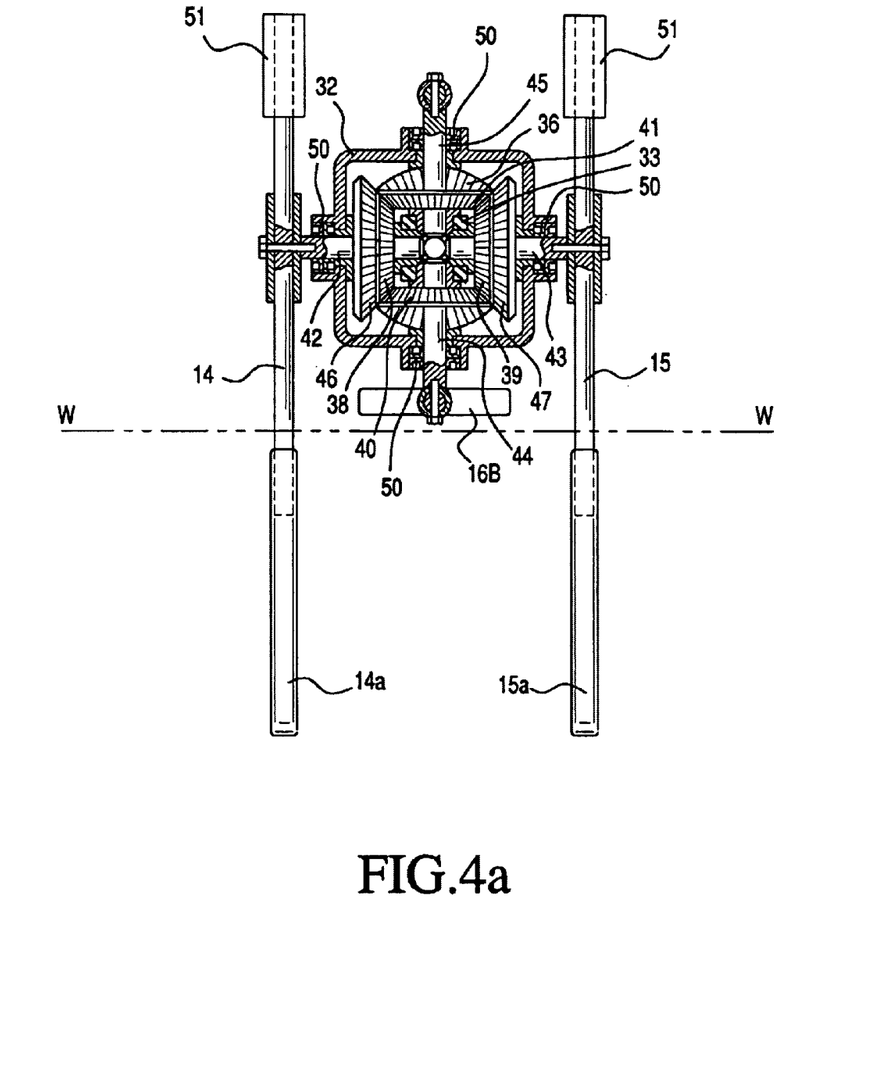
FIG. 4a is a vertical cross-sectional view along line IV—IV in FIG. 4.

FIGS. 4, 4a illustrate another embodiment of a similar propulsion apparatus with horizontally disposed driving shaft 11 and the planetary gearbox 10 with four paddles 14, 15, 16, 17. The designs of the planetary gearbox 10 and the gearbox 24 are the same as in the previously described embodiment. However, the propulsion apparatus is mounted on the transom 13 of the watercraft 12 so that the horizontal driving shaft 11 and the planetary gear-box 10 are disposed over the water level W. Each of the paddles 14, 15, 16, 17 has only one blade which is balanced by a counter-weight 51 relative to the axes of rotation of the output shafts of the planetary gearbox 10. In the operation, during each 90 degrees of rotation of the driving shaft 11, two blades (14a, 15a in FIG. 4) are plunged into the water when they are oriented generally downwards for exerting the propulsive force, while the other two paddles (16b, 17b in FIG. 4) are disposed generally horizontally over the water level. The movements of the blades 14a, 15a, 16b and 17b was explained in a previously described embodiment. Any kind of the protective covers (not shown) can be mounted on the watercraft.

The disposing of the driving shaft 11 with the planetary gearbox 10 above the water surface eliminates their resistance in the water during the movement of the watercraft and improves the reliability of oil sealing elements and other details. There is no need in the dry dock for their repairing. Such propulsion apparatus can be particularly useful for propelling a very shallow-water craft and in other circumstances with a possibility of damaging the submerged parts of the propulsion system.

Figure 5:
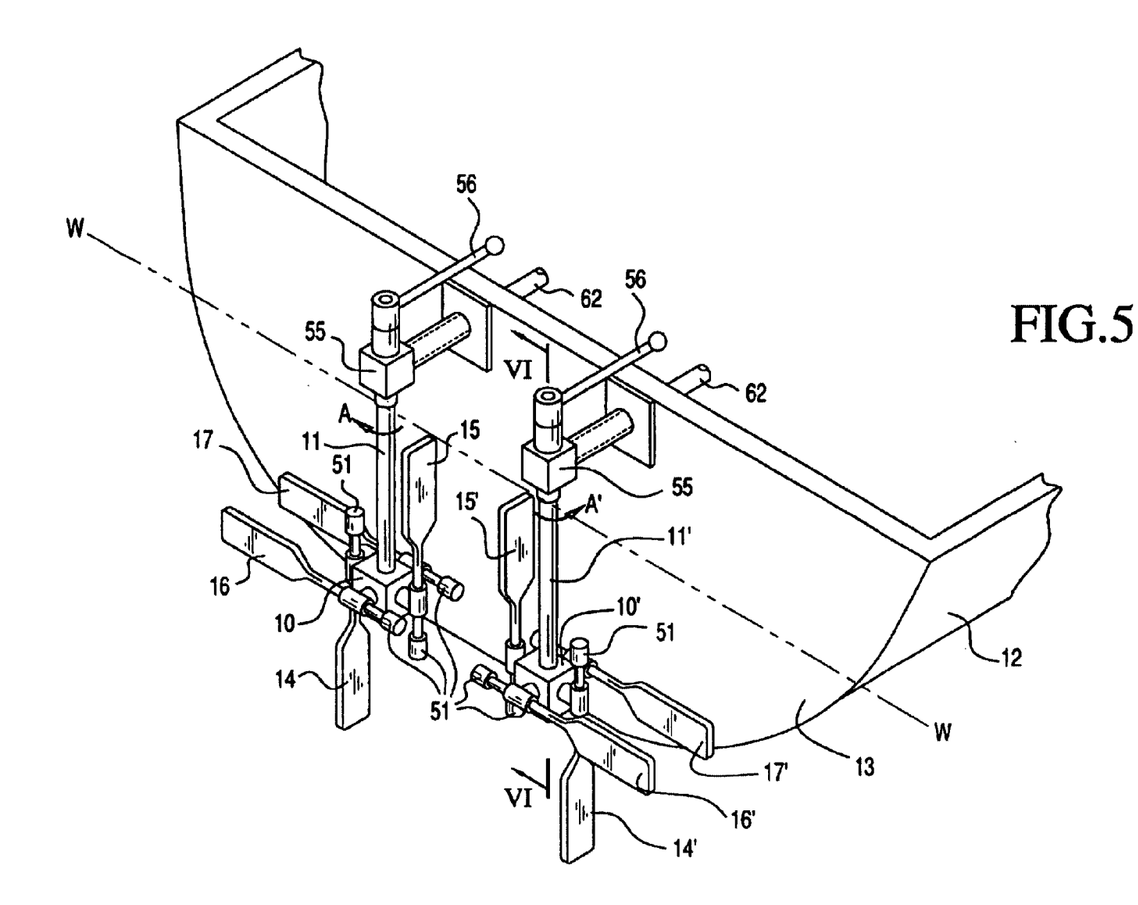
FIG. 5 is a schematic perspective view of the propulsion apparatus with two vertical driving shafts.
Figure 6:
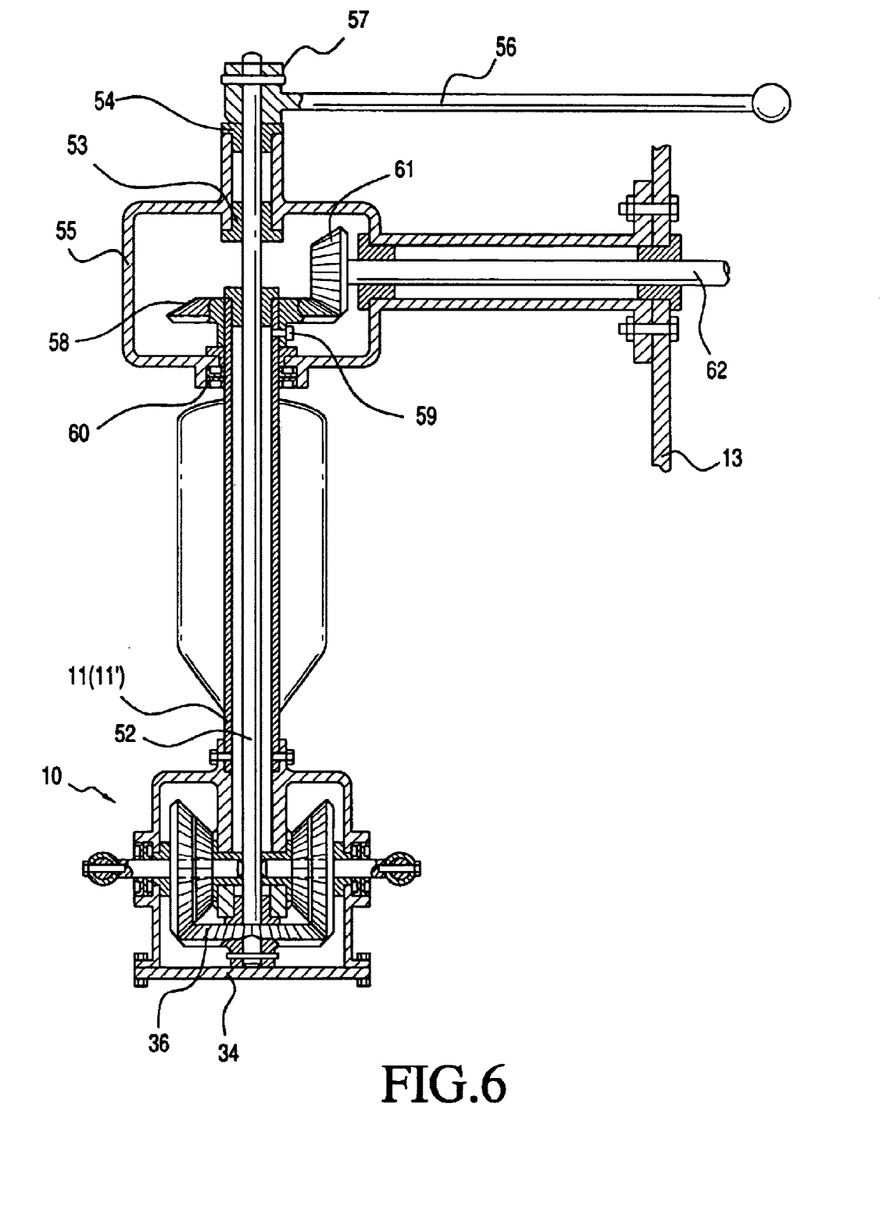
FIG. 6 is a vertical cross-sectional view along line VI—VI in FIG. 5.

FIGS. 5 and 6 illustrate another method of mounting the propulsion apparatus on a watercraft. Two identical driving shafts 11, 11' with planetary gearboxes 10, 10' are disposed vertically with ability to be rotated in opposite directions designated by the arrows A and A'. Each of the paddles mounted on the output axes of these planetary gearboxes has only one blade which is balanced relative to the axes of the output shafts of the planetary gearboxes by a counterweight 51. The paddles 14, 15, 16, 17 mounted on one planetary gearbox 10 are in mirror positions with the blades 14', 15', 16', 17' mounted on the other planetary gearbox 10'. As shown in FIG. 6, each driving shaft 11 or 11' is mounted on a support rod 52 which is mounted in the bearings 53 and 54 of the gearbox 55. A lever 56 is fixed to the end of the support rod 52 by the pin 57. The gearboxes 55 are mounted on the transom 13 of a watercraft over the water level W. The driving shafts 11, 11' and the planetary gearboxes 10, 10' are disposed under the water level W. In the gearbox 55, a bevel gear 58 is fixed on the end of the driving shaft 11 by the bolts 59. The driving shafts extend from the gearboxes 55 through a sealing element 60. The bevel gear 58 is engaged with a pinion bevel gear 61 which is keyed to a shaft 62. The design of the planetary gearboxes 10, 10' are generally similar to the previously described planetary gearbox. However, the support rod 52 does not extend through the cover 34 of the planetary gearbox.

In the operation, the driving shafts 11 and 11' are rotated in opposite directions by an engine (not shown) through the shafts 62 and the gearboxes 55. The direction of the developed propulsion force can be changed by turning the support rod 52 together with the sun bevel gear 36 by the lever 56 which can be connected to any type of steering and maneuvering system (not shown). A protective cover can be mounted over the rotated paddles (not shown).

Figure 7:
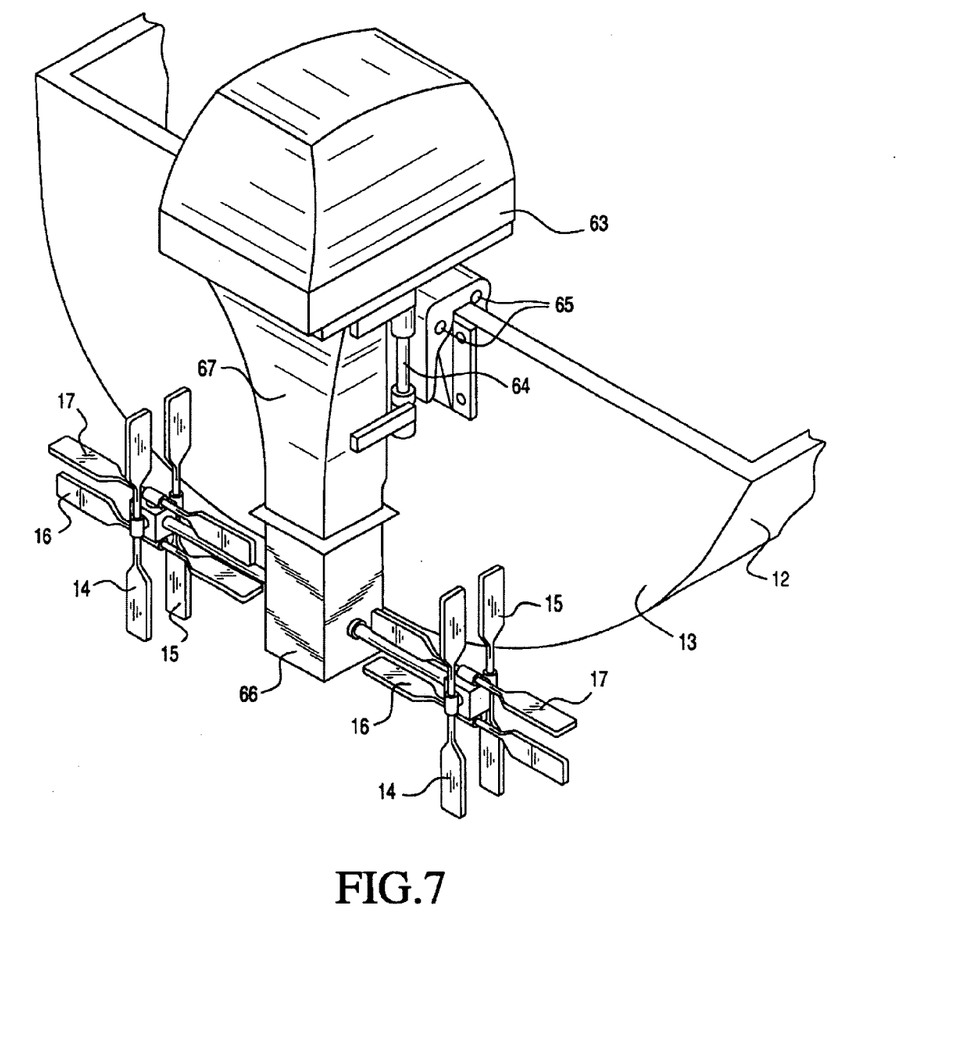
FIG. 7 is a schematic perspective view of an outboard engine with two propulsion apparatus.
Figure 8:
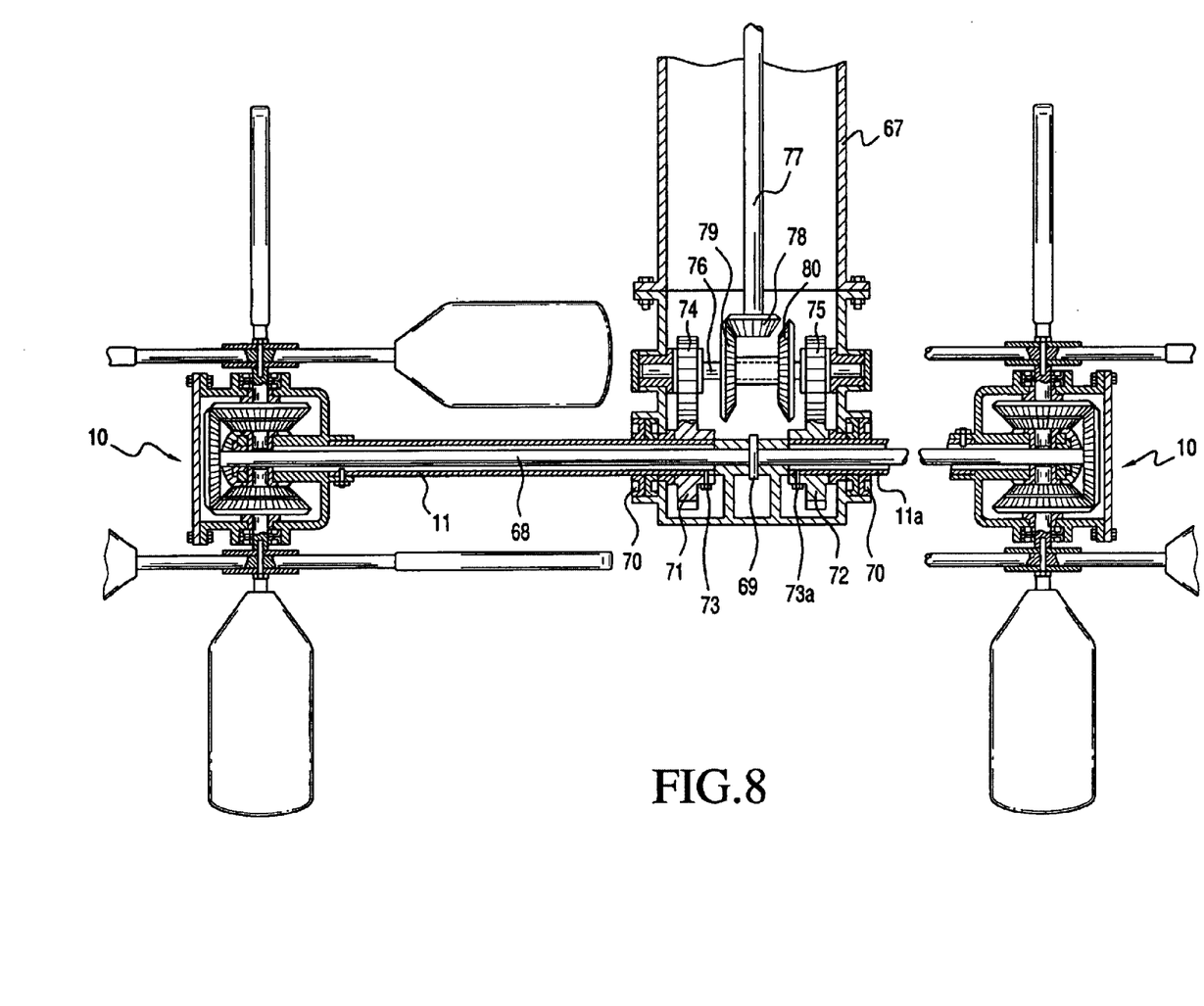
FIG. 8 is a vertical cross-sectional view along line VIII—VIII in FIG. 7.

FIGS. 7 and 8 illustrate an outboard engine 63 which is mounted in a conventional manner on the transom 13 of the watercraft 12 with ability to be turned around the vertical axis 64 or around the horizontal axis 65. A gearbox 66 is mounted on the case extension 67 of the engine. A support rod 68 is fixed by the pin 69 inside of the gearbox 66. Two hollow driving shafts 11 and ha are mounted on the support rod 68 and extend through the sealing elements 70. Identical cylindrical gears 71, 72 are fixed at the ends of the hollow driving shafts 11, 11' by the bolts 73, 73a and engaged with the pinions cylindrical gears 74, 75, respectively, which are keyed to a shaft 76. Two planetary gearboxes 10 with the paddles 14, 15, 16, 17 are mounted on the driving shafts 11, 11'. Each of the paddles has a pair of perpendicular blades which are balanced relative to the axes of the output shafts of the planetary gearboxes.

In the operation, the engine shaft 77 rotates the shaft 76 through the conventional bevel gear engagement 78, 79. For reverse rotation of the driving shafts 11, a bevel gear 80 is mounted on the shaft 76 and can be engaged with the bevel gear pinion 78 instead of the bevel gear 79. The planetary gearboxes 10 and the paddles with two balanced perpendicular to each other blades are operated as previously explained.

While this invention has been described with reference to the structures disclosed herein, they are merely chosen and described to illustrate the principle, applications, and practical use of the invention to thereby better enable others skilled in the art to utilize this invention. The preferred embodiments of the present invention illustrated in FIGS. 1-8 are not confined to the details as set forth and are not intended to be exhaustive or to limit the invention to the precise form disclosed. The invention is intended to cover any modifications, which may be variously practiced within the scope of the following claims or their legal equivalents, rather than by examples given.

What is claimed is:

1. A method of propelling watercraft in water or on the surface of water, including:
    disposing at least one driving shaft generally perpendicular to the advancement direction of said watercraft;
    mounting four fluid moving means on said driving shaft with ability to be rotated around two intercrossed axes, said two intercrossed axes being generally perpendicular to the axis of said driving shaft and to each other, each of said four fluid moving means being extended radially in two opposite directions from one of said two intercrossed axes with the center of gravity of said fluid moving means being disposed generally on said intercrossed axis;
    rotating said driving shaft together with said four fluid moving means, and simultaneously rotating said four fluid moving means around said two intercrossed axes with the speed of rotation of said driving shaft, two of said four fluid moving means being rotated in opposite directions around each of said two intercrossed axes.

2. The method of propelling watercraft of claim 1, further including:
    constraining rotation of said four fluid moving means around said two intercrossed axes with rotation of said driving shaft.

3. The method of propelling watercraft of claim 1, further including:
    disposing a pair of blades on the ends of each of said four fluid moving means, said blades being generally perpendicular to each other.

4. The method of propelling watercraft of claim 1, further including:
    disposing a blade on one end of each of said fluid moving means and a counterweight on the other end of said fluid moving means.

5. The method of propelling watercraft of claim 1 further including:
    disposing said driving shaft generally horizontally in such a depth under the water level that said fluid moving means extend out of the water when they are oriented generally upwards.

6. The method of propelling watercraft of claim 1, further including:
    disposing said driving shaft generally horizontally over the water level so that said fluid moving means extend into the water when they are orientated generally downwards.

7. The method of propelling watercraft of claim 1, further including:
    disposing said driving shaft with said fluid moving means generally vertically.

8. A propulsion apparatus for propelling watercraft in water or on the surface of water, including:
    at least one driving shaft disposed generally perpendicular to the advancement direction of said watercraft;
    at least one planetary gearbox mounted on said driving shaft, said planetary gearbox including four output shafts disposed radially from said driving shaft along two intercrossed axes, said two intercrossed axes being generally perpendicular to the axis of said driving shaft and to each other;
    four fluid moving means, each of said fluid moving means being mounted on one of said four output shafts with radial extensions in two opposite directions and with the centers of gravity of said fluid moving means disposed generally on the axes of rotations of said output shafts, said fluid moving means being constrained by said planetary gearbox to rotate around said output shafts with rotation of said driving shaft;
    and means for rotating said driving shaft together with said planetary gearbox and said fluid moving means.

9. The propulsion apparatus of claim 8, wherein:

said gearbox includes four bevel mitre gears mounted on said output shafts and engaged with each other, at least one additional planet bevel mitre gear mounted on at least one of said output shafts, and at least one sun bevel mitre gear mounted on a support means coaxially with said driving shaft and engaged with said additional planet bevel mitre gear.

10. The propulsion apparatus of claim 9, wherein said driving shaft is hollow and said support means for said sun bevel mitre gear is mounted along the axis of that hollow driving shaft.

11. The propulsion apparatus of claim 10, wherein said hollow driving shaft is mounted on said support means.

12. The propulsion apparatus of claim 10, wherein said support means is mounted with ability to be rotated around its axis for changing the direction of the developed propulsion force.

13. The propulsion apparatus of claim 8, wherein each of said fluid moving means has two blades disposed on its ends generally perpendicular to each other.

14. The propulsion apparatus of claim 8, wherein said driving shaft with said planetary gearbox being disposed generally horizontally in such a depth under the water level that said fluid moving means extend out of the water when they are oriented generally upwards.

15. The propulsion apparatus of claim 8, wherein each of said fluid moving means has a blade on one end and a counterweight on the other end.

16. The propulsion apparatus of claim 8, wherein said driving shaft with said planetary gearbox being disposed generally horizontally over the water level so that said fluid moving means extend into the water when they are orientated generally downwards.

17. The propulsion apparatus of claim 8, wherein said driving shaft with said gearbox being disposed generally vertically.

18. A watercraft including a propulsion apparatus of claim 8.

* * * * *